United States Patent Office 3,087,908
Patented Apr. 30, 1963

3,087,908
RESINOUS MIXTURE COMPRISING A POLYCARBONATE AND AN ORGANOPOLYSILOXANE
David W. Caird, Lanesboro, Mass., assignor to General Electric Company, a corporation of New York
No Drawing. Filed Jan. 12, 1961, Ser. No. 82,161
10 Claims. (Cl. 260—42)

This invention relates to polycarbonate-polysiloxane resin mixtures having desirable physical, chemical and electrical properties, and to their preparation. More particularly, it relates to such compositions containing as a constituent part thereof dihydric phenol-derived carbonate units in which the carbonate group is directly attached to a carbon atom of an aromatic ring, said polycarbonate compositions being modified by the addition thereto of organopolysiloxane material, which facilitates the formation of clear films from said materials, which are free from blemishes, undesirable color effects, bubbles and craters.

Various types of polycarbonate resins are known, among which are those prepared by the ester interchange of carbonate esters with glycols, dihydric phenols or bisphenols and by the reaction of dihydroxymonoaryl compounds, such as hydroquinone and resorcinol, with phosgene or carbonate esters.

Briefly stated, the compositions of this invention comprise carbonate polymers or resins containing structural groups derived from dihydric phenols, the carbonate groups being attached directly to the carbon atom of an aromatic ring, said polymers having added thereto up to about 400 parts per million by weight of an organopolysiloxane based on the weight of the carbonate polymer.

Any dihydric phenol compound is useful for the preparation of resins required in the practice of this invention, such dihydric phenol being defined as a monoaryl or polyaryl phenol type material in which the hydroxyl groups are attached directly to aromatic ring carbon atoms. The dihydric phenol compounds used in connection with the invention can typically be represented by the general formula I 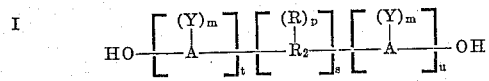

where R is a monovalent hydrocarbon radical, for example, alkyl radicals (e.g., methyl, ethyl, propyl, ispropyl, butyl, decyl, etc.), aryl radicals (e.g., phenyl, naphthyl, biphenyl, tolyl, xylyl, etc.), aralkyl radicals (e.g., benzyl ethylphenyl, etc.), cycloaliphatic radicals (e.g., cyclopentyl, cyclohexyl, etc.), as well as monovalent hydrocarbon radicals containing inert substituents therein, such as halogen (chlorine, bromine, fluorine, etc.). It will be understood that where more than one R is used, they may be alike or different. $R_2$ is selected from the group consisting of an alkylene and alkylidene group such as methylene, ethylene, propylene, propylidene, isopropylidene, butylene, butylidene, isobutylidene, amylene, isoamylene, amylidene, isoamylidene, cyclohexylidene, etc. $R_2$ can also be a silane radical or can be polyalkoxy, such as polyethoxy, polypropoxy, polythioethoxy, polybutoxy, polyphenylethoxy, or polyorganosiloxy, for example, polydimethylsiloxy, polydiphenylsiloxy, polymethylphenylsiloxy, etc. $R_2$ can also consist of two or more alkylene or alkylidene groups such as above, separated by an aromatic group, a tertiary amino group, an ether linkage, a carbonyl group, silene or siloxy group, or by a sulfur-containing group such as sulfide, sulfoxide, sulfone, etc. $R_2$ may also be a glycol dibasic acid ester residue derived from, for example, dibasic acids such a adipic, azelaic, sebacic, isophthalic, terephthalic and alkyl or aryl glycols. Other groupings which can be represented by $R_2$ will occur to those skilled in the art. A is an aromatic ring nucleus. Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from 0 to 1, $t$ and $u$ are whole numbers including zero. When $s$ is zero, however, either $t$ or $u$ may be zero, and not both.

For the dihydric phenol compound, the substituents Y may be the same or different as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents, such as a nitro group, can be represented by Y. Where $s$ is zero in Formula I, the aromatic rings are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (Bisphenol-A); 2,4'-dihydroxydiphenylmethane; bis-(2-hydroxyphenyl)-methane; bis-(4-hydroxyphenyl)-methane; bis-(4-hydroxy-5-nitrophenyl)-methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxyphenyl)-phenylmethane; bis-(4-hydroxyphenyl)-cyclohexylmethane; 1,2-bis-(4-hydroxyphenyl)-1,2-bis-(phenyl)-ethane; 2,2-bis-(4-hydroxyphenyl)-1,3-bis-(phenyl)-propane; 2,2-bis-(4-hydroxyphenyl)-1-phenylpropane; and the like. Also included are dihydroxybenzenes typified by hydroquinone and resorcinol; dihydroxydiphenyls such as 4,4'-dihydroxydiphenyl; 2,2-dihydroxydiphenyl, 2,4'-dihydroxydiphenyl; dihydroxy naphthalenes such as 2,6-dihydroxynaphthalene, etc. Dihydroxy aryl sulfones, such as those set forth in application Serial No. 613,817, filed October 4, 1956, assigned to the same assignee as this invention, are also useful, e.g., bis-(4-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 3'-chloro-4,4'-dihydroxydiphenyl sulfone; bis-(4-hydroxyphenyl)-biphenyl disulfone, etc. The preparation of these and other useful sulfones is described in Patent 2,288,282—Huissmann. Polysulfones as well as substituted sulfones using halogen, nitrogen, alkyl radicals, etc. are also useful. Dihydroxy aromatic ethers such as those set forth in application Serial No. 598,768, filed July 19, 1955, assigned to the same assignee as this invention, are also useful. Methods of preparing such materials are found in Chemical Reviews, 38, 414–417 (1946) and Patent 2,739,171—Linn. Exemplary of such dihydroxy aromatic ethers are 4,4'-dihydroxydiphenyl ether; 4,4'-dihydroxytriphenyldieter; the 4,3'-4,2'-3,3'-, 2,2'-, 2,3'-, etc. dihydroxydiphenyl ethers; 4,4'-dihydroxy-2,5-dimethyldiphenyl ether; 4,4'-dihydroxy-2,6 - dimethyldiphenyl ether; 4,4' - dihydroxy-3,3'-diisobutyldiphenyl ether; 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4-4'-dihydroxy-2,3'-dibromodiphenyl ether; 4,4'-dihydroxydinaphthyl ether; 4,4'-dihydroxy-3,3'-dichlorodinaphthyl ether; 2,4'-dihydroxytetraphenyl ether; 4,4'-dihydroxypentaphenyl ether; 4,4'-dihydroxy-2,6-dimethoxy diphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included.

When a carbonate ester is used in the preparation of the polycarbonate material which is to be modified, the ingredients are reacted at temperatures from about 150° C. to 300° C. or higher for times varying from 1 to 15 or more hours. Under such conditions, an ester interchange occurs between the carbonate ester and the dihydric phenol compound. The ester interchange is advantageously carried out at reduced pressures of around 10 to 100 mm. of mercury, preferably in an inert atmosphere such as of nitrogen, helium, argon, krypton, etc. to prevent undesirable oxidative effects, especially where higher reaction temperatures are used under moderate subatmospheric pressures. Heating under vacuum after the ester interchange is substantially complete (vacuum cooking), for example, at from about 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance, metallic lithium, potassium, caldium, beryllium, magnesium, zinc, cadmium, aluminum, chromium, molybdenum, iron, cobalt, nickel, silver, gold, tin, antimony, lead, barium, strontium, platinum, paladium, etc. and compounds thereof such as alcoholates, oxides, carbonates, acetates, hydrides, etc. Additional catalysts and variations in the ester exchange methods are discussed in Groggins' Unit Processes in Organic Synthesis (4th edition, McGraw-Hill Book Company, 1952), pages 616 to 620. The amount of such catalyst is usually quite small and is of the order of 0.001 to 0.1 percent, by weight, based on the total weight of the reactants.

The diaryl carbonates useful in this connection can be represented by the general formula II 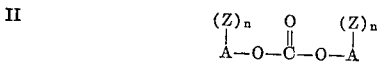

where A is an organic residue in the same sense as in Formula I, Z is an inorganic or organic radical in the same sense as Y of Formula I, and $n$ is an integer. Examples of carbonate esters comprise symmetrical carbonates, for example, diphenyl carbonate, di-(halophenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc; di-(alkylphenyl) carbonates, e.g., di-(tolyl) carbonate, etc., di-(naphthyl) carbonate, di-(chloronaphthyl) carbonate, etc., unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holiman et al., Rec. Trav. Chem. 36, 371 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl ditolyl, and dinaphthyl carbonates by passing phosgene through a column of the phenol in the presence of a catalyst, etc.

The siloxane additive can be introduced into the resin prior to fabrication in any convenient manner, i.e., by co-precipitation, by dry or wet blending with powders or pellets, or by simple addition to resin solutions. It is important that the silicone or siloxane material be uniformly dissolved or dispersed in resin melts or resin solutions. The invention is equally applicable to melt forming and to solution forming techniques.

It will be seen that whether a carbonate ester or phosgene is used in the reaction, the dihydric phenol will produce a dihydric phenol carbonate structural unit which can typically be represented by the following general formula wherein the various letters have the same meaning as above:

III 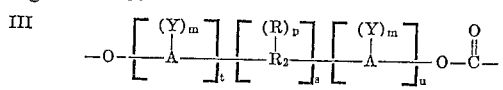

In addition to the polymers described above, copolymers containing carbonate units are also susceptible to treatment according to the present invention. Such copolymer compositions are described, for example, in copending application Serial No. 638,239, filed February 5, 1957, assigned to the same assignee as this invention, which hereby is included by reference as a part of this application. Other materials susceptible to similar treatment are polycarbonate copolymers of dihydric phenols and sulfones as described in copending application Serial No. 679,745, filed August 22, 1957, copolymers of dihydric phenols and aromatic ethers as disclosed in copending application Serial No. 679,746, filed August 22, 1957, and copolymers of dihydric phenols and dibasic acids as disclosed in copending application Serial No. 679,743, filed August 22, 1957, all of the above copending applications being assigned to the same assignee as this invention and being incorporated herein by reference.

Any of the usual well-known liquid or gum-like chain-stopped organopolysiloxanes may be used in connection with this invention. Such organopolysiloxanes may be prepared, for example, by the hydrolysis of hydrolyzable aliphatic-substituted silanes, such as dialiphatic dihalosilanes, for example, dimethyldichlorosilane, followed by complete or partial condensation of the hydrolysis product. They may also be prepared, for example, by hydrolyzing mixtures of hydrolyzable diorgano-substituted silanes either among themselves or with hydrolyzable silanes containing, for example, three organic radicals substituted on the silicon atom, for instance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and, e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups or radicals, for example, halogens, amino groups, alkoxy, aryloxy, acyloxy radicals etc., in addition to the organic groups substituted directly on the silicon atom that are joined to the silicon through carbon-silicon linkages. Examples of such organic radicals are aliphatic radicals including alkyl radicals, for example, methyl, ethyl, propyl, isopropyl, butyl etc.; alicyclic radicals for example, cyclopentyl, cyclohexyl etc.; aryl radicals, for example, phenyl, diphenyl, naphthyl, anthracyl, etc.; aralkyl radicals for example benzyl phenylethyl etc.; alkaryl radicals, for example, tolyl, xylyl, etc.; heterocyclic radicals, etc.; as well as hydrolyzable silanes containing two different organic radicals, for example, methyl and phenyl radicals, etc.; attached to the silicon atom. If desired, the above-mentioned radicals may also contain substituents substituted thereon, for instance, halogens, e.g., di-, tri-, tetra-chlorophenylchlorosilanes, for example, trichlorophenyltrichlorosilane, tetrachlorophenyltrichlorosilane etc. The trihalosilanes, of course, act as chain stoppers.

Hydrolysis of the above silanes or mixtures of silanes results in the formation of silanols, i.e., organo-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, for example, sulfuric acid, hydrochloric acid, ferric chloride, etc. as well as by basic materials, for example, sodium hydroxide, potassium hydroxide, etc. As a result of the hydrolysis and condensation, organo-substituted polysiloxanes may be produced which are partially or completely condensed and which may have on the average up to as high as three organic radicals substituted per silicon atom, but preferably from 1.98 to 2.25 organic groups per silicon atom.

Other directions for preparing the organopolysiloxane compositions employed in the practice of the present invention may be found disclosed and claimed in Patnode Patents 2,469,888 and 2,469,890, issued May 10, 1949; these patents are assigned to the same assignee as the present invention.

Chain-stopped organopolysiloxane gums are also useful in connection with the invention. These are highly viscous masses or gummy elastic solids depending on the state of condensation, the condensing agent employed, and the starting organopolysiloxane used to make the gummy material. A typical gummy organopolysiloxane is obtained by the condensation of a liquid organopolysiloxane containing an average of from about 1.95, preferably from about 1.98 to about 2.05, organic groups per silicon atom. The usual condensing agents which may be employed and which are well known in the art include, for instance, ferric chloride hexahydrate, phenyl phosphoryl chloride, alkaline condensing agents such as potassium hydroxide, sodium hydroxide, etc. These convertible organopolysiloxanes generally contain polymeric diorganopolysiloxanes which may contain, for example, about 2 mole percent copolymerized mono-organopolysiloxane, for example, copolymerized monomethylsiloxane. Generally, the starting liquid organopolysiloxane is one which contains about 1.999 to 2.01, inclusive, organic groups, for example, methyl groups, per silicon atom and where more than about 90 percent, preferably 95 percent, of the silicon atoms in the polysiloxane contain two silicon-bonded alkyl groups. A typically useful gum is prepared by mixing together about 95 mole percent octamethylcyclotetrasiloxane, and about 5 mole percent octaphenylcyclotetrasiloxane, at a temperature from about 150° C. to 175° C. for about 4 hours with about 0.01 percent potassium hydroxide based on the weight of the siloxane, until a highly viscous, gummy solid is obtained. Generally, the amount of octaphenylcyclotetrasiloxane can be varied up to about 20 mole percent of the total mixture for the purpose of the invention.

As pointed out above, the present invention involves polycarbonatepolysiloxane compositions having enhanced properties and film forming capabilities as well as fiberforming capabilities. The compositions are prepared by the intermixing of the polycarbonate material and the organopolysiloxane, as by co-precipitation, by dry or wet blending, or by addition of the siloxane to resin solutions, it being important that the siloxane material be uniformly dissolved or dispersed in the resin melts or solutions. The amount of siloxane which has been found useful in the present application varies up to about 400 parts per million by weight of polycarbonate resinous material; preferably up to about 100 parts per million are used and most preferably from about 20 parts per million to 50 parts per million of the siloxane material are utilized. Among the methods which can be employed for the mixing of the polycarbonate and siloxane are dry incorporation, mixing rolls, dough mixers, Banbury mixers, extruders, and other similar mixing equipment. Melt blending of the materials is employed and is advantageously carried out under an inert atmosphere or vacuum, where indicated. As pointed out above, the siloxane material may be simply added to a solution of the polycarbonate material in an appropriate solvent. The resulting polycarbonate organopolysiloxane composition can, after mixing, be handled in any conventional manner employed for the fabrication or manipulation of thermoplastic resins. The materials may be cast or molded using compression, injection, calendering and extrusion techniques. The organopolysiloxane can also be incorporated into the ester exchange reaction mixture where a melt blending is indicated. The materials can also be combined by techniques involving mixing, tumbling, or spraying of the solid polycarbonate prior to extrusion or other fabrication process, which in itself provides the mixing action.

As pointed out above, the incorporation of a siloxane into the polycarbonate system in the amounts prescribed enhances the film-forming qualities of the material, as well as the fiber-forming capabilities, producing with ease structures which are clear or free from haze or other detracting color effects, and which are homogeneous throughout and free from puddles, craters, fish-eyes or other degrading features.

The following examples illustrate the practice of this invention and are to be taken as illustrative thereof rather than as limiting.

*Example 1*

There were added to a polycarbonate prepared from Bisphenol-A varying amounts of a dimethylsiloxane fluid as described above, having a viscosity of 500 centistokes, the addition of a siloxane material to the polycarbonate being made by adding the siloxane to a methylene chloride solution of the polycarbonate. When films were cast from such materials containing respectively 50 parts per million, 100 parts per million, 200 parts per million, 400 parts per million, and 1000 parts per million of siloxane, the castability of the material on a clean glass casting surface was good. The films were also free from imperfections, such as bubbles, craters and fish-eyes. However, at siloxane concentrations above 400 parts per million, a slight haziness detracted from the clearness of the film.

*Example 2*

Example 1 was repeated except that 100 parts per million and 200 parts per million of a dimethylpolysiloxane fluid having a viscosity of 50 centistokes were used. Films cast very readily on a glass surface from such a solution and film quality were clear and free from physical defects.

*Example 3*

Example 1 was repeated except that a chlorinated methylphenylpolysiloxane fluid was used in proportions of 100 parts per million and 200 p.p.m. Again, the films cast very readily on a cast glass surface and were free from physical abnormalities and were essentially clear.

*Example 4*

Example 1 was repeated except that a higher viscosity methylpolysiloxane fluid having a viscosity of 30,000 centistokes was used in proportions of 50 p.p.m., 100 p.p.m., 200 p.p.m., 400 p.p.m. and 1000 p.p.m. All of the films cast very readily on the glass surface. At a concentration of 50 p.p.m., the film was essentially free of physical defects and was clear. At a concentration of 100 p.p.m., like characteristics were obtained. At a concentration of 200 p.p.m., while the film was uniformly free of defects, there was a barely detectable haze which detracted very slightly from the clearness of the film. This haze increased at 400 p.p.m. concentration and 1000 p.p.m. concentration, with the accompaniment of small bubbles for fish-eyes.

*Example 5*

Example 1 was repeated except that a methylpolysiloxane having a viscosity of 10,000 centistokes was used in proportions of 100 p.p.m. and 200 p.p.m. In each case, the film cast very readily on the glass surface with no physical defects and with little or no haze to detract from the clearness of the material, even at a concentration of 200 p.p.m.

*Example 6*

Example 1 was again repeated using a methylpolysiloxane fluid having a viscosity of only 20 centistokes in concentrations of 50 p.p.m., 100 p.p.m., 200 p.p.m., 400 p.p.m. and 1000 p.p.m. At all concentrations, the solutions readily cast a film on the glass base with no physical defects at concentrations up to 100 p.p.m. At from 200 p.p.m. up, some haze occurred which detracted little from the clearness of the material.

*Example 7*

Example 1 was repeated using a methylpolysiloxane fluid having a viscosity of 10 centistokes in concentrations of 100 p.p.m. and 200 p.p.m. The materials gave a readily castable film with no physical defects such as bubbles, fish-eyes and the like, as well as an essentially clear material.

It is emphasized that in the present invention, the polysiloxane is used in relatively small proportions to enhance the surface tension effect and the appearance of the final material during its formation. This is directly as opposed to the use of such organopolysiloxane materials as plasticizers, in which case a hazy, translucent or opaque product is obtained.

*Example 8*

A polycarbonate prepared from Bisphenol-A had intermixed with it 100 parts per million of methylsiloxane polymer of 50 centipoise viscosity by tumbling. The blended material was melt-extruded to provide 3 to 4 mil thick sheets which were clear and quite free of fish-eyes and other structural defects. On the other hand, the same polycarbonate when extruded without the silicone had many more fish-eyes and defects.

*Example 9*

Example 1 was repeated except that a methylphenylpolysiloxane fluid was used in the proportion of 100 parts per million. Films were cast very readily from the polycarbonate-polysiloxane solution on a cast glass surface. The films were very clear and free from physical defects, such as by fish-eyes, and the like.

There are provided, then, by this invention polycarbonate materials which, by means of the addition of critical quantities of organopolysiloxane, are capable of forming physically homogeneous and clear films, fibers and the like. While the examples have been directed primarily to the casting and extrusion of films from such materials, it will be realized that they may as readily be utilized in injection molding, compression molding and hot spinning. The films which result from the present materials are useful as wrapping or packaging materials, as metal or fiber liners, containers, covers, closures, in laminates, electrical insulating or other tapes, recording tapes, pipe coverings, etc. The improved films obtained herein are not the result of the releasing or external lubricant effect but are the result of internal structural changes in the material caused by the intermixed silicone material.

What I claim as new and desire to secure by Letters Patent of the United States:

1. A resinous material comprising a mixture of (1) organopolysiloxane and (2) a polycarbonate material derived from dihydric phenol in which the carbonate group is attached directly to a carbon atom of an aromatic ring, the organopolysiloxane being present in amounts up to about 400 parts per million, by weight, of polycarbonate material.

2. A resinous material comprising a mixture of (1) chain-stopped alkylpolysiloxane and (2) a polycarbonate material derived from dihydric phenol in which the carbonate group is attached directly to a carbon atom of an aromatic ring, the alkylpolysiloxane being present in amounts up to about 400 parts per million, by weight, of polycarbonate material.

3. A resinous material comprising a mixture of (1) methylpolysiloxane and (2) a polycarbonate material derived from dihydric phenol in which the carbonate group is attached directly to a carbon atom of an aromatic ring, the methylpolysiloxane being present in amounts up to about 400 parts per million, by weight, of polycarbonate material.

4. A resinous material comprising a mixture of (1) alkylarylpolysiloxane and (2) a polycarbonate material derived from dihydric phenol in which the carbonate group is attached directly to a carbon atom of an aromatic ring, the alkylarylpolysiloxane being present in amounts up to about 400 parts per million, by weight, of polycarbonate material.

5. A resinous material comprising a mixture of (1) chain-stopped organopolysiloxane and (2) a polycarbonate material derived from dihydric phenol in which the carbonate group is attached directly to a carbon atom of an aromatic ring, the organopolysiloxane being present in amounts up to about 100 parts per million, by weight, of polycarbonate material.

6. A resinous material comprising a mixture of (1) chain-stopped organopolysiloxane and (2) a polycarbonate material derived from dihydric phenol in which the carbonate group is attached directly to a carbon atom of an aromatic ring, the organopolysiloxane being present in amounts of from 20 to 50 parts per million, by weight, of polycarbonate material.

7. A film comprising a mixture of (1) chain-stopped organopolysiloxane and (2) a polycarbonate material, the organopolysiloxane being present in amounts of up to about 400 parts per million of polycarbonate material.

8. Electrical insulation material comprising a mixture of (1) chain-stopped organopolysiloxane and (2) a polycarbonate material derived from a dihydric phenol, the organopolysiloxane being present in amounts of up to about 400 parts per million of polycarbonate material.

9. A molded article comprising a mixture of (1) chain-stopped organopolysiloxane and (2) a polycarbonate material derived from a dihydric phenol, said organopolysiloxane being present in amounts of up to about 400 parts per million of polycarbonate material.

10. A laminate comprising laminae and a resinous material comprising a mixture of (1) chain-stopped organopolysiloxane and (2) polycarbonate material derived from a dihydric phenol, said organopolysiloxane being present in amounts of up to about 400 parts per million of polycarbonate material.

References Cited in the file of this patent
UNITED STATES PATENTS
2,999,835    Goldberg _____ Sept. 12, 1961